June 30, 1964  F. WILLIAMS ETAL  3,138,909
VARIABLE DISCHARGE CROP HARVESTER
Filed June 16, 1960  2 Sheets-Sheet 1

Inventors
FREDERICK WILLIAMS
HAROLD GLENN BOWDITCH
By Norris & Bateman
Attorneys 3,138,909
VARIABLE DISCHARGE CROP HARVESTER
Frederick Williams, Leigh, England, and Harold Glenn Bowditch, Sydney, New South Wales, Australia, assignors to Harrison McGregor & Guest Limited, Leigh, England
Filed June 16, 1960, Ser. No. 36,506
5 Claims. (Cl. 56—24)

The invention relates to agricultural machines of the kind provided with a power-driven shaft carrying flails adapted to cut material and impel it through a chute. More particularly, but not exclusively, it relates to machines wherein flails are adapted to impel material into a load-carrying body, deflector means being provided for directing the material into said body. The load-carrying body may be a trailer vehicle or a lorry or it may form part of the machine provided with the flail-carrying shaft, which machine may be self-propelled or adapted to be towed by, and to receive drive from, a draught vehicle. Such machines are normally employed for the cutting and loading of silage crops or for the loading of previously cut crops, although they may be used for loading other materials.

The object of the invention is to provide means whereby machines of the kind referred to can be usefully employed to impel material into a silo or the like.

According to the invention, deflector means for a machine of the kind referred to comprise a shroud adapted to envelop part of the cylinder of revolution of the flails, alternative discharge openings in said shroud, and means for selectively uncovering one and blanking-off the other of said openings according to the direction in which it is desired to deliver material impelled by the flails.

Figure 1:
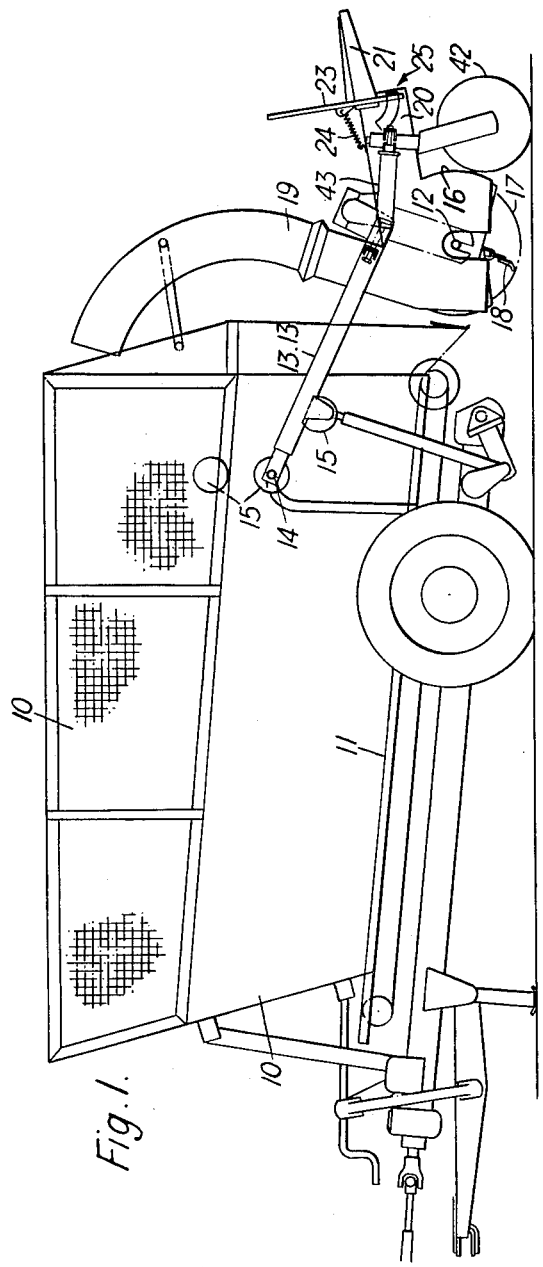
Figure 2:
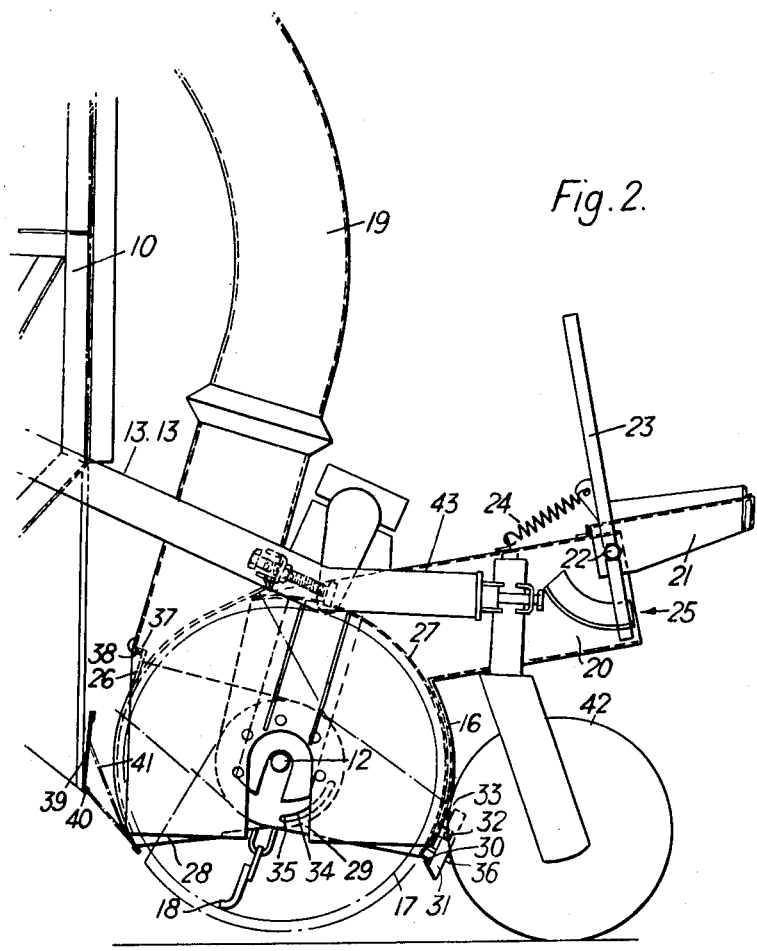

A preferred embodiment of the invention will now be described, by way of example only, with reference to the accompanying drawings, of which:

FIG. 1 is a view showing deflector means, constructed in accordance with the invention, fitted to a machine of the kind referred to provided with a load-carrying body, and FIG. 2 is a view of the deflector means on a somewhat larger scale.

Referring now to the drawings, an agricultural machine, comprising a load-carrying body 10, an endless conveyor 11 for moving a load towards the open right hand end of said body in FIGURE 1; three laterally-extending tined beater shafts 15, and a flail-carrying shaft 12, hereinafter referred to as a "flail cylinder," carried by a pair of arms 13, 13 pivotally connected at 14 one at each side to the said body; is provided with deflector means constructed in accordance with the present invention. The said deflector means comprise a part-cylindrical shroud 16, with closed ends, enveloping part of the cylinder of revolution 17 of the flails 18 and having alternative discharge openings. One of the said openings communicates with an upwardly extending chute 19 adapted to direct material into the load-carrying body 10, whilst the other of the said openings communicates with a rearwardly extending chute 20 adapted to direct material into a silo or the like. The rearwardly extending chute 20 is provided with a flap 21, pivoted at 22, for varying the distance to which material can be projected by the flails. Said flap is manually operable by means of a hand lever 23, and a spring 24 is provided to balance the overhanging weight of the flap. A ratchet device 25 is also provided by means of which the flap 21 may be retained in any adjusted position.

Means are provided for blanking-off one or other of the discharge openings, and comprise two segments of a cylinder, each of said segments being freely pivotable about the flail-carrying shaft 12 inside the part-cylindrical shroud 16. One of said segments comprises a cylindrically curved plate 26 connected at each end to a flat radial plate 28, and the other of said segments comprises a cylindrically curved plate 27 connected at each end to a flat radial plate 29. Each plate 29 is disposed between one of the plates 28 and the adjacent end of the part-cylindrical shroud 16. The plate 27, which is provided for blanking-off the discharge opening communicating with the rearwardly extending chute 20, has a radial projection 30 adapted to co-operate with one end of a latch member 31 pivoted at 32 adjacent the lower rear edge of the shroud 16, the other end of the said latch member being acted upon by a spring 33. As shown in FIG. 2 of the drawings, the latch member 31 is adapted to hold the plate 27 in the position in which the discharge opening communicating with the rearwardly extending chute 20 is blanked-off. When the latch is released, however, the plate 27 is able to drop into the position shown in chain-dotted lines in FIG. 2, so as to uncover the opening communicating with the chute 20. Being of greater weight than the plate 26, the plate 27 is employed to simultaneously lift said plate 26 from a position in which it covers an opening in the front of the part-cylindrical shroud 16, as shown in the drawings, into the position (also shown chain-dotted in FIG. 2) in which the opening communicating with the chute 19 is blanked-off. Since the plate 26 is not required to move through as large an angle as is the plate 27 a lost motion connection between the two plates is provided and comprises slots 34 in the end plates 29 of the plate 27 and co-operating pins 35 projecting from the end plates 28 of the plate 26. The plate 27 can thus be moved independently of the plate 26 to an extent determined by the length of the slots 34.

The plate 27 is provided with a radially extending handle 36 by means of which it can be returned to the position in which it blanks-off the opening communicating with the rearwardly extending chute 20. During the first portion of the return movement of the plate 27, the plate 26 is automatically returned to the position in which it covers the opening in the front of the part-cylindrical shroud 16, and is retained in this position by means of a projecting lip 37 formed along the upper edge of said plate and abutting against a radial projection 38 formed within said shroud.

The load-carrying body 10 of the machine is provided with a flap 39 extending across the full width of said body. Said flap is hinged at 40 and is adapted to be either retained in a substantially vertical position as shown in full lines in FIG. 2 or dropped into a lowered position in which it is suspended by a length of chain 41, as shown in chain-dotted lines in FIG. 2. The purpose of the flap 39 is to facilitate the passage of material from the load-carrying body 10 to the flail cylinder as hereinafter described.

A pair of ground engaging castor wheels 42 are carried by extensions 43 of the arms 13, and are positioned in height with respect to the flail cylinder in order to determine the cutting height of the latter above the ground.

In operation, the machine may be employed either to cut forage and load it into the load-carrying body 10, or to impel the material so loaded into a silo or the like. When it is desired to perform the first of these operations, the plates 26 and 27, and the flap 39, are adjusted into the positions shown in full lines in FIG. 2. The machine can then be towed behind a tractor vehicle, its moving parts being driven by the power-take-off shaft of said vehicle. Material cut by the flail cylinder will thus be impelled into the load-carrying body 10. When it is desired to unload said body, the machine is maneuvered into a position where the rearwardly extending chute 20 is directed towards a silo or the like into which it is intended to discharge the load, and the plates 26 and 27, and the flap 39, are adjusted into the positions shown in chain-dotted lines in FIG. 2. The moving parts of the machine can then be driven by the power-take-off shaft of the tractor vehicle and the endless conveyor 11 be caused to move the load of material rearwardly towards the flail cylinder. The tined beater shafts 15 are rotatable by power means in a clockwise direction as viewed in FIGURE 1 so as to throw back into the body 10 material above a certain height being moved rearwardly by the conveyor 11, and thus to prevent too great a volume of material being delivered to the flail cylinder. As the material reaches the rearward end of the body 10 it falls from the conveyor and is guided by the flap 39 through the opening in the front of the shroud 16. The material is thus impelled by the flail cylinder through the rearwardly extending chute 20 into the silo or the like. As previously mentioned, the flap 21 can be manually controlled to vary the distance to which the material is impelled.

What is claimed is:

1. An agricultural apparatus for cutting crop material and for selectively loading it and unloading it with respect to a load carrying body, said agricultural apparatus comprising a flail assembly having a rotatably mounted flail shaft and a plurality of flails radially connected at corresponding ends to said shaft, an open bottomed shroud partially encircling and being coextensive with said flail assembly, said shroud having different directed material discharge openings through which said flails are operable to impel cut crop material upon rotation of said shaft, and closure means for said discharge openings comprising a pair of curved plate members associated one with each of said discharge opening, means mounting each of said plate members for swinging movement about an axis coincident with the rotational axis of said shaft and between two angularly spaced positions where each of said plate members is respectively disposed to cover and thereby blank off its associated discharge opening and to uncover its associated discharge opening permitting said flails to impel material therethrough, and motion transmitting means connecting said plate members for interdependent movement enabling displacement of one of said plate members from position to the other by displacement of the other of said plate members.

2. An agricultural machine comprising a power-driven rotatable shaft, a plurality of flails secured to said shaft and having outer extremities defining a cylinder of revolution, an open bottom shroud enveloping part of said cylinder of revolution, two differently directed material discharge openings in said shroud, a chute communicating with one of said openings, and closure means comprising at least one curved plate swingable about the axis of said shaft operatively connected to said shroud and being positionable for selectively blanking off either of said openings.

3. An agricultural machine comprising a power-driven rotatable shaft, a plurality of flails secured to said shaft and having outer extremities defining a cylinder of revolution, an open bottom shroud enveloping part of said cylinder of revolution, two differently directed material discharge openings in said shroud, a chute communicating with one of said openings, closure means operatively connected to said shroud and being positionable for selectively blanking off either of said openings, said closure means comprising a pair of curved plates operatively associated one with each of said openings and being swingably displaceable about the axis of said shaft, and motion transmitting means linking said plates together for interdependent movement.

4. An agricultural machine comprising a power-driven rotatable shaft, a plurality of flails secured to said shaft and having outer extremities defining a cylinder of revolution, an open bottom shroud enveloping part of said cylinder of revolution, two differently directed material discharge openings in said shroud, a chute communicating with one of said openings, closure means operatively connected to said shroud and being positionable for selectively blanking off either of said openings, said closure means comprising a pair of curved plates operatively associated one with each of said openings and being swingably displaceable about the axis of said shaft, and motion transmitting means linking said plates together for interdependent movement, said motion transmitting means comprising lost motion means enabling one of said plates to be swingably displaced through a predetermined distance independently of movement of the other of said plates.

5. An agricultural machine comprising a power-driven rotatable shaft, a plurality of flails secured to said shaft and having outer extremities defining a cylinder of revolution, an open bottom shroud enveloping part of said cylinder of revolution, two differently directed material discharge openings in said shroud, a chute communicating with one of said openings, and closure means operatively connected to said shroud and being positionable for selectively blanking off either of said openings, said closure means comprising a pair of curved plates operatively associated one with each of said openings and being swingably displaceable about the axis of said shaft, and motion transmitting means linking said plates together for interdependent movement, said motion transmitting means comprising lost motion means enabling one of said plates to be swingably displaced through a predetermined distance independently of movement of the other of said plates, and said lost motion means comprising a pin and slot connection.

References Cited in the file of this patent

UNITED STATES PATENTS 2,999,346     Mathews _____ Sept. 12, 1961

FOREIGN PATENTS 1,199,177     France _____ June 15, 1959